(12) United States Patent
Dimond et al.

(10) Patent No.: US 10,877,891 B2
(45) Date of Patent: Dec. 29, 2020

(54) CACHE STASHING IN A DATA PROCESSING SYSTEM

(71) Applicant: ARM Limited, Cambridge (GB)

(72) Inventors: Robert Gwilym Dimond, Cambridge (GB); Eric Biscondi, Roquefort les Pins (FR); Paul Stanley Hughes, Whittlesford (GB); Mario Torrecillas Rodriguez, Cambridge (GB)

(73) Assignee: ARM LIMITED, Cambridge (GB)

( * ) Notice: Subject to any disclaimer, the term of this patent is extended or adjusted under 35 U.S.C. 154(b) by 66 days.

(21) Appl. No.: 16/149,430

(22) Filed: Oct. 2, 2018

(65) Prior Publication Data
US 2019/0114262 A1 Apr. 18, 2019

(30) Foreign Application Priority Data

Oct. 12, 2017 (GB) .................................. 1716755.2

(51) Int. Cl.
| | |
|---|---|
| *G06F 12/08* | (2016.01) |
| *G06F 12/0842* | (2016.01) |
| *G06F 9/48* | (2006.01) |
| *G06F 12/0862* | (2016.01) |

(52) U.S. Cl.
CPC ........ *G06F 12/0842* (2013.01); *G06F 9/4843* (2013.01); *G06F 12/0862* (2013.01); *G06F 2212/1021* (2013.01); *G06F 2212/608* (2013.01)

(58) Field of Classification Search
CPC .... G06F 3/0604; G06F 3/0629; G06F 3/0631; G06F 3/0632; G06F 3/0638; G06F 3/0643; G06F 3/065; G06F 3/0653; G06F 3/067; G06F 9/4843; G06F 12/0842; G06F 12/0862; G06F 2212/1021; G06F 2212/6028; G06F 2212/608
USPC .......................... 711/154, 170, 171, 119, 137
See application file for complete search history.

(56) References Cited

U.S. PATENT DOCUMENTS

| | | | |
|---|---|---|---|
| 9,336,162 B1 | 5/2016 | Sathe et al. | |
| 2006/0085602 A1* | 4/2006 | Huggahalli | G06F 9/345 |
| | | | 711/137 |
| 2006/0224831 A1* | 10/2006 | Yoshikawa | G06F 12/0806 |
| | | | 711/137 |
| 2008/0244231 A1 | 10/2008 | Kunze et al. | |
| (Continued) | | | |

OTHER PUBLICATIONS

Combined Search and Examination Report for GB1716755.2 dated Mar. 21, 2018, 6 pages.

*Primary Examiner* — Gary J Portka
(74) *Attorney, Agent, or Firm* — Nixon & Vanderhye P.C.

(57) ABSTRACT

A data processing system and a method of data processing are provided. The system comprises a first data processing agent, a second data processing agent, and a third data processing agent. Each of the second and third data processing agents have access to one or more caches. A messaging mechanism conveys a message from the first data processing agent to one of the second and third data processing agents specified as a message destination agent in the message. A stashing manager monitors the messaging mechanism and selectively causes data associated with the message to be cached for access by the message destination agent in a cache of the one or more caches in dependence on at least one parameter associated with the message and at least one stashing control parameter defined for a link from the first data processing agent to the message destination agent.

18 Claims, 8 Drawing Sheets

(56) References Cited

U.S. PATENT DOCUMENTS

2010/0088335 A1* 4/2010 Mimatsu ............... H04L 67/06
                                                        707/770
2013/0151787 A1   6/2013 Riguer et al.
2016/0062894 A1   3/2016 Schwetman, Jr. et al.

* cited by examiner

| SOURCE AGENT | DESTINATION AGENT | LINK DEFINITIONS | STASHING PARAMETER(S) |
|---|---|---|---|
| A | X | HOST DEVICE; MESSAGE BUFFER | STASH - YES; L1$ |
| A | X | HOST DEVICE; MESSAGE BUFFER | STASH - YES; SYSTEM CACHE |
| A | Y | HOST DEVICES; MESSAGE BUFFER | STASH - NO |

CACHE STASHING IN A DATA PROCESSING SYSTEM

This application claims priority to GB Patent Application No. 1716755.2 filed Oct. 12, 2017, the entire contents of which are hereby incorporated by reference.

TECHNICAL FIELD

The present techniques relate to data processing. More particularly they relate to cache stashing in a data processing system.

BACKGROUND

A data processing system may be provided with one or more caches to improve performance by reducing the access latency associated with accessing data items in memory. Copies of the data item in memory can be caused to be stored in a cache when that data item is accessed in the memory, such that subsequent accesses to the same data item do not incur the same access latency. Further, a bus master in a data processing system may proactively cause a specific item of data to be stored in a specific cache in the data processing system in a technique called cache stashing, which may be used to position copies of particular data items in a particular cache before a data processing device with access to that cache requires them.

SUMMARY

Embodiments provide a data processing system comprising:
 a first data processing agent, a second data processing agent, and a third data processing agent, wherein each of the second data processing agent and the third data processing agent have access to one or more caches;
 a messaging mechanism to convey a message from the first data processing agent to one of the second data processing agent and the third data processing agent specified as a message destination agent in the message;
 stashing management circuitry to monitor the messaging mechanism and selectively to cause data associated with the message to be cached for access by the message destination agent in a cache of the one or more caches in dependence on at least one parameter associated with the message and at least one stashing control parameter defined for a link from the first data processing agent to the message destination agent.

Embodiments provide a method of data processing comprising:
 operating a first data processing agent, a second data processing agent, and a third data processing agent in a data processing system, wherein each of the second data processing agent and the third data processing agent have access to one or more caches;
 conveying via a messaging mechanism a message from the first data processing agent to one of the second data processing agent and the third data processing agent specified as a message destination agent in the message;
 monitoring the messaging mechanism and selectively causing data associated with the message to be cached for access by the message destination agent in a cache of the one or more caches in dependence on at least one parameter associated with the message and at least one stashing control parameter defined for a link from the first data processing agent to the message destination agent.

Embodiments provide a data processing system comprising:
 means for operating a first data processing agent;
 means for a second data processing agent;
 means for operating a third data processing agent, wherein each of the means for operating a second data processing agent and the means for operating a third data processing agent have access to one or more means for caching;
 means for conveying via a messaging mechanism a message from the means for operating a first data processing agent to one of the means for operating a second data processing agent and the means for operating a third data processing agent specified as a message destination agent in the message;
 monitoring the messaging mechanism and selectively causing data associated with the message to be cached for access by the message destination agent in a means for caching of the one or more means for caching in dependence on at least one parameter associated with the message and at least one stashing control parameter defined for a link from the first data processing agent to the message destination agent.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
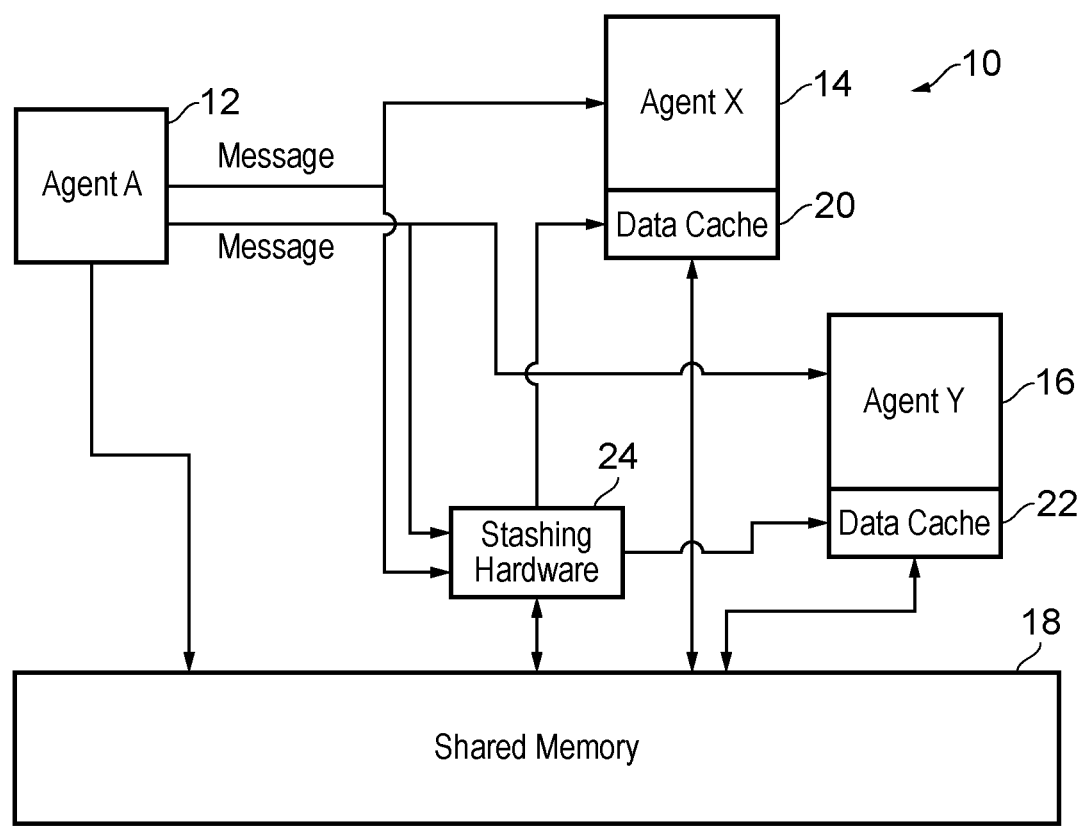
FIG. 1 schematically illustrates a data processing system in one embodiment.

At least some embodiments provide a data processing system comprising:
 a first data processing agent, a second data processing agent, and a third data processing agent, wherein each of the second data processing agent and the third data processing agent have access to one or more caches;
 a messaging mechanism to convey a message from the first data processing agent to one of the second data processing agent and the third data processing agent specified as a message destination agent in the message;

stashing management circuitry to monitor the messaging mechanism and selectively to cause data associated with the message to be cached for access by the message destination agent in a cache of the one or more caches in dependence on at least one parameter associated with the message and at least one stashing control parameter defined for a link from the first data processing agent to the message destination agent.

The data processing system comprises a number of data processing agents which carry out the data processing operations of the system. It should be appreciated that although there could be a direct correspondence between a data processing agent in the data processing system and a physical device in the data processing system, this need not be the case and indeed the data processing agents may take a variety of forms, for example a data processing agent may be a dedicated hardware device or may be a software task, either of which could perform the corresponding data processing. The messaging mechanism of the data processing system enables the data processing agents to communicate with one another and (in particular in the context of the present techniques) to indicate to another data processing agent when that data processing agent should perform a particular data processing task. The messaging mechanism further supports a view of the data processing system in which data processing agents are defined, such that the first data processing agent can send a message to a message destination agent (one of the second and third data processing agents), by specifying that message destination agent in the message. Since the data processing system allows data processing agents to be variously defined, including both software and hardware agents, this means that the first data processing agent issuing the message does not need to specify a physical destination for the message, but rather specifies the agent to which that message should be conveyed, and it is the underlying messaging mechanism of the data processing system which conveys that message to the message destination agent (wherever that happens to physically be in the data processing system).

In this context, the present techniques provide stashing management circuitry which can cause selected items of data to be proactively cached ("stashed") in a cache of the data processing system. Such caches are of course physically associated with hardware devices in the data processing system, for example such as level one caches closely associated with a processor core, level two caches possibly shared by more than one processor core, system caches with sider accessibility, and so on. The stashing management circuitry monitors the messaging mechanism and understands the format of the messages which it conveys. Moreover the messaging mechanism makes reference to a set of defined "links" between the data processing agents, for which various parameters may be defined, for example indicating a buffer in memory used to hold messages passed from a defined source data processing agent to a defined destination data processing agent for that link. A defined link between two data processing agents in the system also provides at least one stashing control parameter, which can for example control at least one aspect of caching of the data associated with the message in the cache of the one or more caches. In this context the stashing management circuitry determines where to cache data associated with the message on the basis of at least one parameter associated with the message and with reference to at least one stashing control parameter defined for the corresponding link from the first data processing agent to the message destination agent. Accordingly, it will be understood that the stashing management circuitry is therefore arranged to identify data associated with the message, to identify a message destination agent specified in the message, to identify at least one parameter associated with the message, and to identify at least one stashing control parameter defined for the relevant link. Note that in some embodiments the at least one parameter associated with the message could be the specification of the message destination agent in the message itself, such that the stashing management circuitry makes use of this identification (i.e. of the message destination agent) to determine which cache of the one or more caches in the data processing system should have the identified data cached in it. In other embodiments the at least one parameter associated with the message could be the link used to send the message, such that the stashing management circuitry makes use of the definition of this link (and therefore of the message destination agent) to determine which cache of the one or more caches in the data processing system should have the identified data cached in it.

This approach supports flexibility in how cache stashing may be performed in a data processing system, because there is no need for the first data processing agent which issues the message to have any knowledge of the physical device (and its associated cache or caches) which is hosting or will host the message destination agent. For example this enables the data processing agents to be software tasks communicating with one another, with no knowledge of the underlying physical system in which those software tasks are being executed, but nevertheless for cache stashing to be initiated to support those software tasks on the basis of the messages which they exchange. Of course this does not preclude the data processing agents from being hardware devices and indeed the data processing agents could be software agents, hardware agents, or a heterogeneous mix of the two. Further, the at least one parameter associated with the message in dependence on which the stashing management circuitry causes the data to be cached may take a variety of forms. As mentioned above, this parameter could be the specification of the message destination agent itself, and it could be an identification of the link used and therefore the message destination agent, but in other embodiments it could also be a settable parameter indicating that a particular data item should be cached or not, it could indicate the manner in which the caching should take place, it could impose further rules on the manner in which the caching is performed, and so on.

The at least one stashing control parameter defined for the relevant link may be provided by a variety of sources, but in one example the messaging mechanism may comprise a session table defining links between data processing agents in the system and the at least one stashing control parameter may be provided as an additional parameter within that table. This approach recognises that messages being passed between data processing agents via a given link may commonly have the same purpose, and have similar stashing requirements, and therefore efficiencies may be gained by defining the stashing control parameters on this link basis, rather than on a message-by-message basis, since individual message headers are simplified (reduced in size) and ultimately the system bandwidth consumption is reduced. Similarly, data associated with a related stream of messages are likely to have similar stashing requirements.

In some embodiments the data processing system further comprises a plurality of data processing devices to host the first data processing agent, the second data processing agent, and the third data processing agent, wherein the stashing management circuitry is responsive to host information indicative of a host data processing device for the message destination agent of the plurality of data processing devices to cause the data associated with the message to be cached in a selected cache of the one or more caches accessible to the host data processing device.

The manner in which the plural processing devices host the data processing agents may vary, where each data processing agent could be hosted by a different data processing device, one data processing device could host more than one of the data processing agents, or indeed a single data processing device could host all of the data processing agents. The stashing management circuitry is provided with host information which enables it to determine a physical host data processing device on which the message destination agent is being or will be hosted and on the basis of this indication of a physical device can cause the data to be cached in a selected cache associated with (accessible to) that host data processing device.

The host information could take a variety of forms, and in some embodiments could be relatively static, even with a fixed mapping of data processing agents to physical data processing devices, or could be more dynamic in embodiments in which the mapping of data processing agents to data processing devices changes over the course of the operation of the data processing system. Indeed, where the data processing agents may be software agents, in some embodiments the data processing system further comprises a task scheduler to schedule software tasks for execution on the plurality of data processing devices, wherein the host information is provided by the task scheduler as a scheduled allocation to the host data processing device of a software task corresponding to the message destination agent. This task scheduler could take a variety of forms, but may for example itself be a software task running in the system.

Accordingly, the stashing management circuitry can receive information from the task scheduling circuitry indicating a host data processing device in which the message destination agent (the target software task of the message) is currently executing or is scheduled to be executed. On that basis the stashing management can then cause the data to be cached in a cache for access by that software task in a cache which is accessible to the host data processing device on which the software task is (or will be) executing.

Nevertheless, it may also be the case that the information received by the stashing management circuitry from the task scheduling circuitry indicates that for example the software task is not currently running and is not expected to run again within a sufficiently short time period, and on this basis the stashing management circuitry can use this information as an indication that it is not worthwhile to stash the data. Hence in some embodiments the stashing management circuitry is responsive to the scheduled allocation indicating that the software task corresponding to the message destination agent is not expected to begin execution within a predetermined time period to select not to cause the data associated with the message to be cached in the cache of the one or more caches.

The operation of the stashing management circuitry, and in particular the manner in which it performs the caching of the data associated with the message may be even more configurable, and in some embodiments the stashing management circuitry is responsive to at least one further stashing control parameter to configure at least one aspect of caching of the data associated with the message in the cache of the one or more caches. In other words, one or more further stashing control parameters may be provided in addition to those which are provided as defined for the link from the first data processing agent to the message destination agent. Even greater configurability of the stashing can then be supported.

Both the at least one stashing control parameter defined for the link and the at least one further stashing control parameter may take a variety of forms, but in some embodiments at least one of these stashing control parameters specifies a cache level at which the data associated with the message is to be cached.

In some embodiments the at least one stashing control parameter specifies a state type with which the data associated with the message is to be cached. Where the target cache for the stashing supports different types for its content, this allows the at least one stashing control parameter to control that type when the data is stashed. This type can take a variety of forms, but could for example specify whether that stashed data is in unique or shared. In some embodiments the at least one of these stashing control parameters specifies a cache coherency protocol state with which the data associated with the message is to be cached. Thus, where the cache in to which the data is stashed belongs to a system which implements a cache coherency protocol, a defined cache coherency protocol state for a cache line in which the data is stored can be specified by the stashing control parameter. For example the state may be specified as shared, modified, or exclusive. Depending on the manner in which the cache data is expected to be used (e.g. only to be read, or alternatively to be modified) can indicate a suitable coherency state.

The manner in which the data associated with the message which is selectively cached by the stashing management circuitry is identified may take a variety of forms, but in some embodiments at least one of the stashing control parameters specifies a size of the data associated with the message which is to be cached. For example, it may be the case that the message specifies a data address (for example as the first data address of a block of data which is to be processed by the message destination agent on receipt of the message), and the specification of a size as a stashing control parameter enables a specific portion of that data to be cached. For example, the stashing control parameter could specify a first portion of the data to be processed which is to be stashed (cached in advance). It may be the case that only the first portion of the data needs already to be present in the cache to avoid a cache miss and software prefetching techniques in the system may suffice to ensure that future accesses to the remainder of the data will not miss in the cache.

Accordingly, a stashing control parameter may indicate less than all the data associated with the message which is to be cached and hence in some embodiments the at least one stashing control parameter specifies a subset of a greater set of data associated with the message as the data associated with the message which is to be cached. This subset may be variously defined, but in some embodiments the subset is specified as at least one offset and data length within the greater set of data associated with the message. Several offsets and data lengths may be defined in order to select non-contiguouous portions of the greater set of data.

The stashing management circuitry may be provided with the at least one further stashing control parameter in a variety of ways, but in some embodiments the at least one stashing control parameter forms part of the message. This therefore means that the originator of the message (the first data processing agent) is provided with a mechanism via which it can influence the manner in which the data is cached. In particular where it is recognised that a present technique support data processing agents which may be embodied as software, this therefore enables a software task to configure and influence the manner in which cache stashing takes place, despite not having any knowledge of the underlying data processing system on which the software is executing.

The message passed from the first data processing agent to the message destination agent may comprise a pointer referencing a buffer in which data to be processed is held (and from which potentially some data should be caused to be stashed in a cache by the stashing management circuitry) and in some embodiments the at least one further stashing control parameter is predefined for a buffer holding the data associated with the message to which a pointer in the message points. Accordingly, independent buffers to which messages exchanged within the system may point can have independent controls with regard to cache stashing. This may for example allow some buffers to be stashed and not others (for example only the first subset in a sequence of buffers) and moreover this may enable potential cache thrashing to be reduced (i.e. by limiting the amount of data which is stashed) by caching only an initial set of buffers and relying, say, on software prefetching mechanisms to ensure that future accesses to subsequent buffers do not miss in the relevant cache.

The data associated with the message may be specified in a variety of ways. In some embodiments the data associated to the message is comprised within the message itself. In some embodiments the data associated with the message is indicated by an address comprised within the message. In some embodiments the data associated with the message is referenced by a pointer comprised within the message.

At least some embodiments provide a method of data processing comprising:

operating a first data processing agent, a second data processing agent, and a third data processing agent in a data processing system, wherein each of the second data processing agent and the third data processing agent have access to one or more caches;

conveying via a messaging mechanism a message from the first data processing agent to one of the second data processing agent and the third data processing agent specified as a message destination agent in the message;

monitoring the messaging mechanism and selectively causing data associated with the message to be cached for access by the message destination agent in a cache of the one or more caches in dependence on at least one parameter associated with the message and at least one stashing control parameter defined for a link from the first data processing agent to the message destination agent.

At least some embodiments provide a data processing system comprising means for operating a first data processing agent;

means for a second data processing agent;

means for operating a third data processing agent, wherein each of the means for operating a second data processing agent and the means for operating a third data processing agent have access to one or more means for caching;

means for conveying via a messaging mechanism a message from the means for operating a first data processing agent to one of the means for operating a second data processing agent and the means for operating a third data processing agent specified as a message destination agent in the message;

monitoring the messaging mechanism and selectively causing data associated with the message to be cached for access by the message destination agent in a means for caching of the one or more means for caching in dependence on at least one parameter associated with the message and at least one stashing control parameter defined for a link from the first data processing agent to the message destination agent.

Some particular embodiments are now described with reference to the figures.

FIG. 1 schematically illustrates a data processing system 10 in one embodiment. Three data processing agents 12, 14, and 16 are illustrated (also labelled as Agent A, Agent X, and Agent Y). These data processing agents perform data processing operations for which purpose they have access to the shared memory 18. Additionally, data processing agent 14 is shown to have an associated data cache 20 and data processing agent 16 is shown to have an associated data cache 22. In a manner with which one of ordinary skill in the art will be familiar, the data caches 20 and 22 enable these data processing agents to maintain local copies of data items retrieved from the shared memory 18 to improve performance by reducing the access latency associated with retrieving these items from the shared memory 18. FIG. 1 also schematically illustrates that the data processing system comprises a messaging mechanism via which the data processing agents can communicate with one another. In particular, this messaging mechanism can be used such that one data processing agent can signal to another data processing agent that it should perform some data processing operations with respect to a certain set of data stored in a shared memory 18. For example, the data processing agent 12 (Agent A) may for example perform its own data processing operations preparing some data stored in the shared memory 18 and when this is complete may issue a message to one of the data processing agents 14 or 16 (Agents X or Y) that further data processing on that data should now be carried out by the recipient of the message. In support of this the data processing system 10 further comprises stashing hardware 24 which monitors the messages exchanged between the data processing agents in the system. Accordingly, when data processing agent 12 issues a message to data processing agent 14 this is also effectively received by the stashing hardware 24 and when the data processing agent 12 issues a message to the data processing agent 16 this is also effectively received by the stashing hardware 24. The stashing hardware 24 examines messages which it receives and can selectively cause data associated with the message to be cached in one of the data caches 20 and 22. Hence when the stashing hardware 24 sees a message sent from data processing agent 12 to data processing agent 14 indicating that data processing agent 14 should begin data processing of a certain set of data stored in the shared memory 18, the stashing hardware 24 can initiate a caching procedure (for example, by issuing a suitable memory transaction to the shared memory 18) to cause at least some of that data to be stashed (i.e. cached in advance) in the data cache 20 associated with data processing agent 14. Similarly, when the stashing hardware 24 sees a message directed to the data processing agent 16 it can cause appropriate data to be stashed in the data cache 22. The stashing hardware 14 can determine which data to stash and where that data should be stashed in various ways, as will be discussed in more detail with reference to the further figures. In some embodiments such as that shown in FIG. 1 a data address contained within the message may be used by the stashing hardware 24 to determine which data addresses should be stashed into data cache 20 local to the data processing agent 14 (Agent X) and which should be stashed into the data cache 22 local to the data processing agent 16 (Agent Y). Importantly, whatever criteria are used to decide which data to cache where, this means that there are no restrictions on the data addresses which may be used by agent 12 which issued the message.

Figures 2A, 2B:
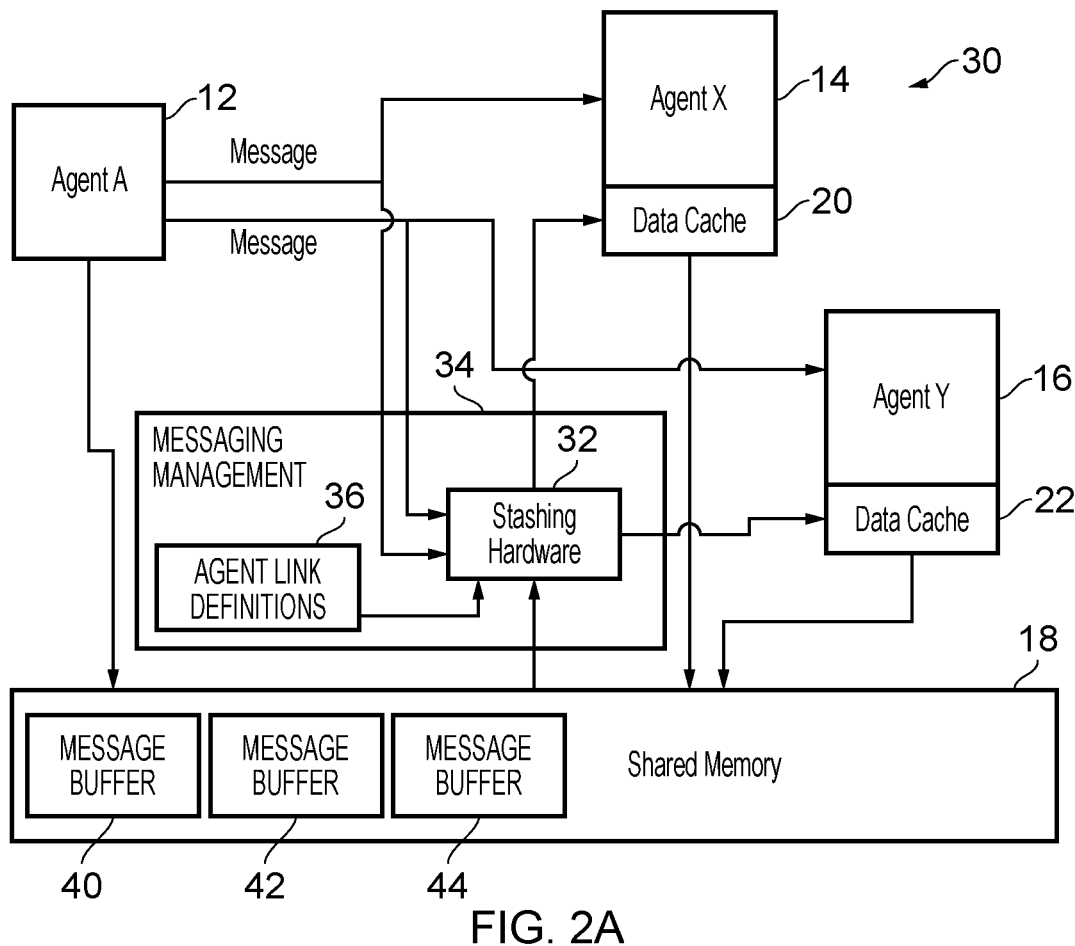
FIG. 2A schematically illustrates a data processing system in one embodiment and FIG. 2B shows a session table giving an example link definition for two agents in the data processing system of FIG. 2A, together with some associated stashing control parameters.

FIG. 2A schematically illustrates a data processing system 30 which gives one example of an implementation in accordance with the data processing system 10 shown in FIG. 1. Here the same data processing agents 12, 14, and 16, with the associated data caches 20 and 22 are shown, all of which have access to the same shared memory 18. The example embodiment of FIG. 2A schematically illustrates that the stashing hardware 32 in this embodiment forms part of a messaging management component 34 of the data processing system 30. For example, the messaging management unit 34 may be provided as a dedicated hardware accelerator device explicitly for the purpose of facilitating messaging between the data processing agents in the system. Accordingly, the messaging management unit 34 administers the messaging mechanism of the data processing system 30. Nevertheless, the particular manner in which the messaging mechanism is provided is not significant to an understanding of the present techniques, although a particular example is given in the example embodiment of FIG. 2A to facilitate the present discussion. As shown in the figure, the message management unit 34 also has access to a set of agent link definitions 36. These agent link definitions establish the messaging mechanism between respective agents in the system and in the example shown make reference to a number of message buffers 40, 42, and 44 which are shown stored in the shared memory 18. Thus here the particular mechanism provided for one agent to convey a message to another agent is for this message to be temporarily stored in a message buffer in the shared memory 18 from which the recipient agent can retrieve that message. The administration of these messages and the buffers in memory is carried out by the messaging management unit 34 in particular with reference to the agent link definitions 36. One example of a set of agent link definitions is given in FIG. 2B in the form of a session table, which specifies a source agent, a destination agent, one or more link definitions, and one or more cache stashing control parameters. The first example shown indicates a link defined from source agent A (item 12 in FIG. 2A) to destination agent X (item 14 in FIG. 2A) and defines the relevant host devices and the message buffer which will be used to hold the message sent from Agent A to Agent X. Additionally, cache control parameters indicating that cache stashing for this link should indeed take place ("stash-yes") and that the data should be stashed in a level one cache (L1$) associated with the target host device. The second example shown indicates a second link defined from source agent A to destination agent X and defines the relevant host devices and the message buffer which will be used to hold the message sent from Agent A to Agent X. Here the cache control parameters indicate that cache stashing for this link should indeed take place ("stash-yes") but that the data should be stashed in a system associated with the target host device. Accordingly, depending on the link used the stashing manager can modify the way that the stashing occurs. Indeed in some instances the stashing manager may configure the stashing only with reference to the link definition for the message and without any reference to any content of the message. For example, monitoring of the message buffers (and their associated control data) may be used to notice that a message has been sent, and the link definition then used to configure the stashing, without reference to specific content of the message, other than to identify the data that needs to be stashed.

Figure 3:
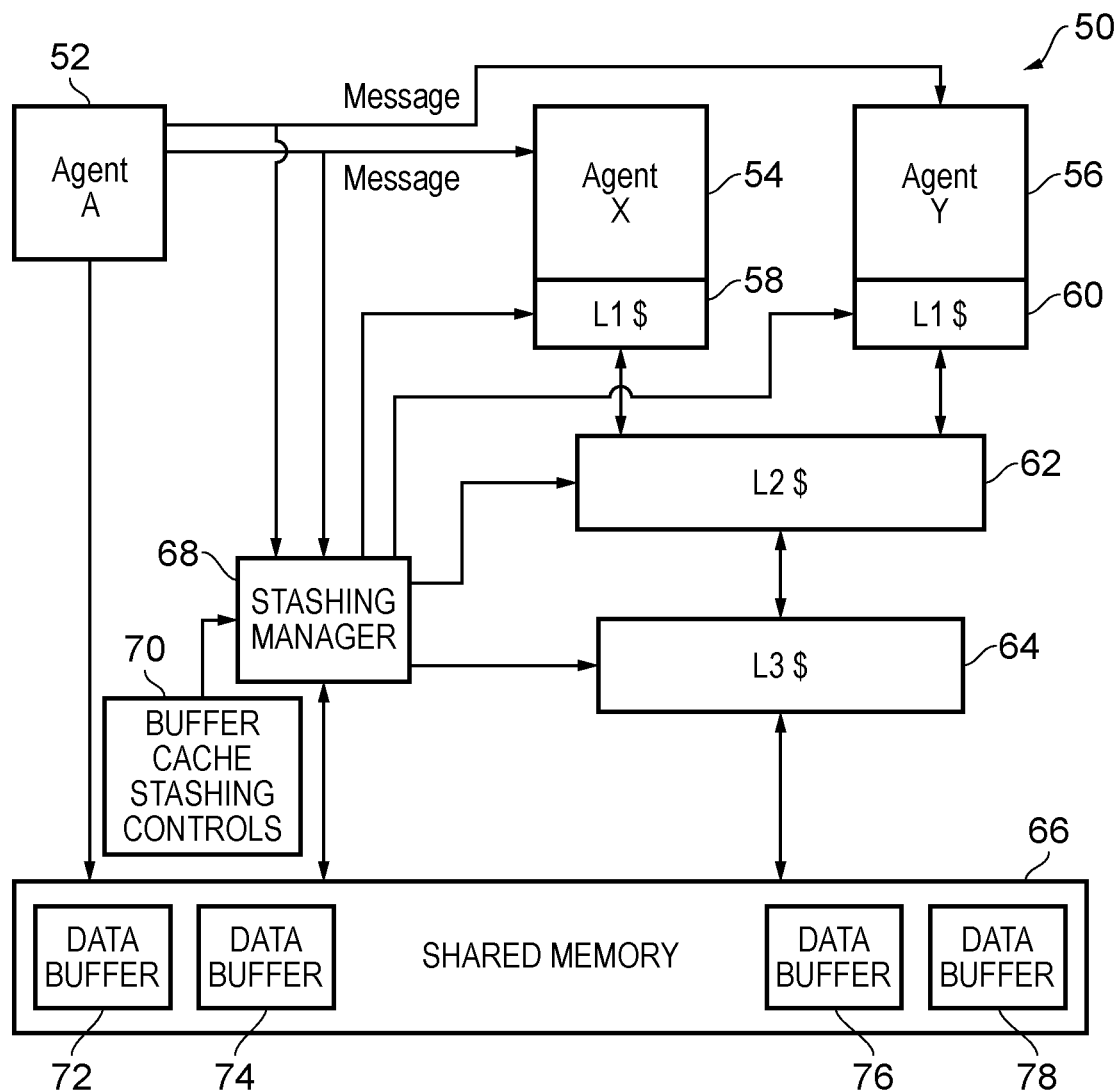
FIG. 3 schematically illustrates a data processing system in one embodiment with multiple cache levels.

FIG. 3 schematically illustrates a data processing system 50 in one embodiment in which the data processing agents which are the recipient of a message access the shared memory via a hierarchy of cache levels. Agent A 52 is the origin of the message, which is received by either Agent X 54 or Agent Y 56. Each of these two recipient data processing agents has access to a respective local level 1 cache 58, 60 and they share level 2 and level 3 caches 62 and 64 as part of the cache hierarchy which leads to the shared memory 66. The stashing manager 68 which also receives the messages issued by agent 52 can thus cause specified data to be stashed in any of the caches 58, 60, 62, 64 in dependence on the specified message destination agent in the message (i.e. Agent X or Agent Y) and in dependence on other stashing control parameters which may determine the cache level at which the caching should take place. FIG. 3 additionally indicates that the stashing manager 68 receives further buffer cache stashing controls 70. These correspond to defined data buffers 72, 74, 76, and 78 in the shared memory 66, where data processed and referenced by the data processing agents 52, 54, and 56 are stored. The buffer cache stashing controls 70 enable independent controls for each buffer in the shared memory 66 to be defined. For example where these buffers in the shared memory 66 may have different purposes this enables the cache stashing to be tailored to be suitable to those purposes. For example, one data buffer (e.g. 72) may be used for packet headers, whilst another (e.g. 74) may be used for message payloads, and a different cache stashing behavior may be appropriate for each. Alternatively or in addition where data referenced by a message is stored across a number of buffers, it may be desirable to limit the cache stashing to only a first set of the buffers (i.e. not to all) to reduce potential cache thrashing, such that for example only those initial buffers are stashed and software prefetching mechanisms are relied upon to ensure that future accesses do not miss in the relevant cache.

Figure 4A:
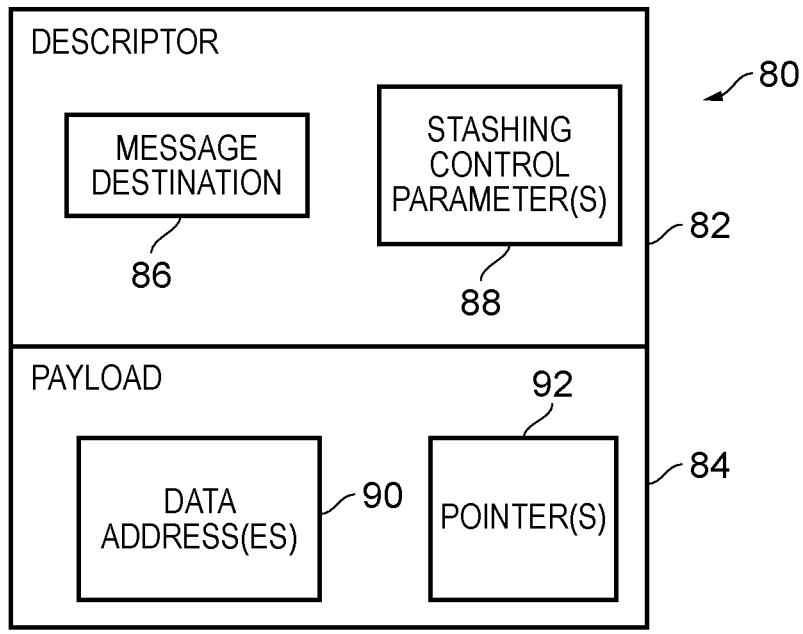
FIG. 4A schematically illustrates a message comprising a descriptor and a payload and FIG. 4B shows an example set of stashing control parameters.

FIG. 4A schematically illustrates the structure of an example message 80 conveyed by the messaging mechanism from one data processing agent to another, which essentially comprises two parts namely a descriptor 82 and a payload 84. Each of these portions of the message may be variously configured, but an essential part of the descriptor (header) portion 82 is a specification of the message destination 86. In the embodiment shown the descriptor portion 82 also comprises at least one further stashing control parameter to enable further configuration of the stashing behavior with respect to this message, in particular to be controlled on a message-by-message basis. The payload portion 84 of the message essentially needs to provide an indication of the data to which the message refers, and in the present context to indicate the data to which the recipient message destination agent will then need to make access. FIG. 4A schematically illustrates that this could be indicated by means of at least one data address 90 and/or at least one pointer 92.

Figure 4B:
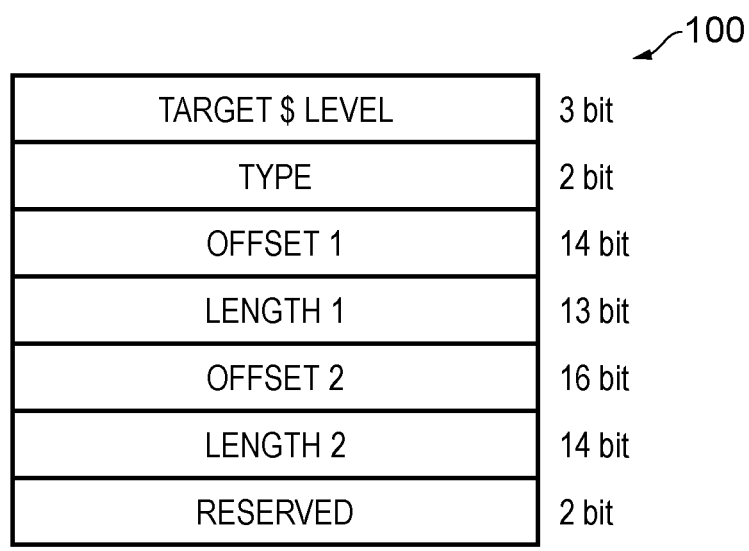

The stashing control parameters may be variously defined, and FIG. 4B gives one example embodiment of a set of stashing control parameters 100. This set of stashing control parameters may be provided in a number of ways in the system, for example as part of an individual message (in the example of item 88 in FIG. 4A), as part of the parameters defining the link (as in the example shown in FIG. 2B) or on the basis of a buffer pointed to by a message (as in the example shown in FIG. 3). Thus, FIG. 4B schematically illustrates the definition of a 64-bit stashing control field which may be stored in any of these places in the system in order to configure stashing behavior at various levels of granularity. The parameters which may be controlled by the stashing control field 100 are: a target cache level at which the stashing should take place; a type to be allocated to the stashed data (e.g. unique or shared). Note that this type could in some embodiments be a coherency status (i.e. for a cache coherency protocol in which the target cache participates); a first offset and length to define a first subset within the referenced data; and); and a second offset and length to define a second subset within the referenced data. The final 2 bits of this 64-bit stashing control field are reserved.

Figure 5:
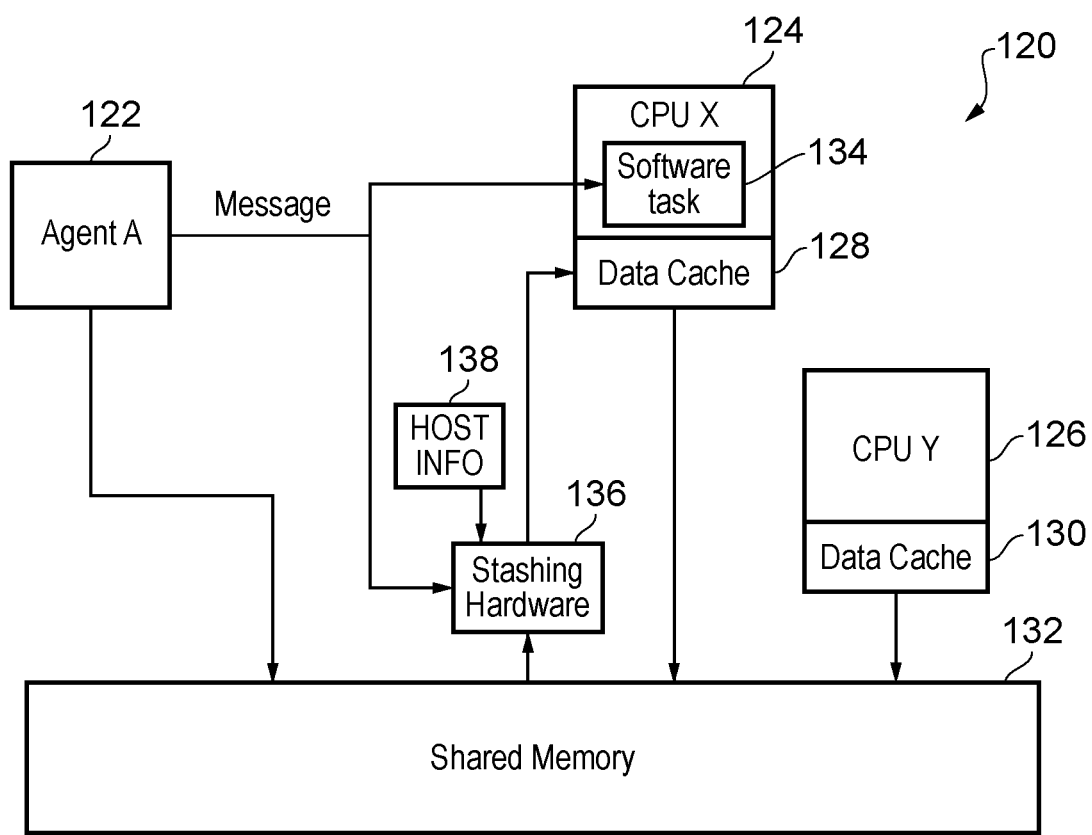
FIG. 5 schematically illustrates a data processing system in one embodiment highlighting the execution of a software task on a specific CPU.

It is important to note that the data processing agents which exchange messages and for which cache stashing capability is supported by the stashing hardware of the present techniques may be embodied either as hardware devices or as software tasks. FIG. 5 schematically illustrates an example embodiment which illustrates that the recipient of a message issued by Agent A 122 is a software task 134, where this software task 134 is executing on a physical data processing device 124 (in this example CPU X). The CPU 124 has an associated data cache 128, whilst another CPU Y 126 has an associated data cache 130 in this data processing system 120. Both the CPU 124 and CPU 126 have access to a shared memory 132. It should therefore be appreciated here that Agent A 122, when issuing its message to the software task 134, need have no awareness of the physical data processing device on which that software task is executing and the routing of the message to the correct recipient is provided for by the messaging mechanism of the data processing system 120. Nevertheless, the stashing hardware 136 of the data processing system 120 itself has access to host information 138 from which it can determine where the software task 134 (the recipient of the message) is hosted and therefore can cause the data stashing to take place in the data cache 128 associated with the host device 124 on which software task 134 is shown to be hosted.

Figure 6A:
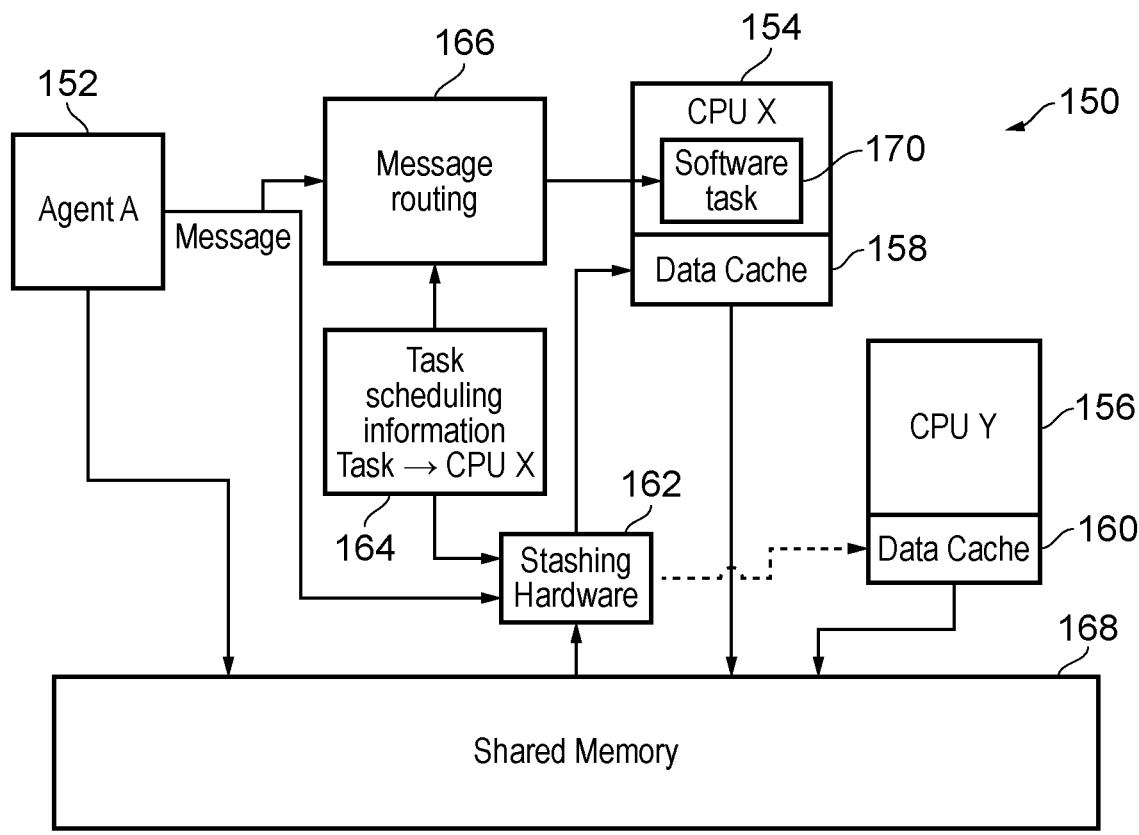
FIG. 6A schematically illustrates a data processing apparatus in one embodiment in which task scheduling information is used to control the cache stashing behaviour and FIG. 6B gives more detail of how the task scheduling information may be used.

This host information may take a variety of forms, and FIG. 6A shows an example of this in which a data processing system 150 comprises a task scheduler 164 which allocates software tasks to the CPUs 154 and 156 in the data processing system for execution. It will be understood that such a task scheduler will commonly itself be implemented in software, and the placement of the task scheduler as item 164 in the figure is schematic in that case and then item 164 relates more to the task scheduling information itself which is received by items 162 and 166. Hence, message routing circuitry 166 providing part of the messaging mechanism within the data processing system 150 receives this information such that when a message is issued by Agent A 152 it can route the message to the CPU on which that software task is executing. In the example of FIG. 6A, software task 170 is the recipient of the message and is shown executing on CPU X 154. Alternatively in this example it could have been executing on CPU Y 156. Both CPU X 154 and CPU Y 156 have local cache data caches 158 and 160 respectively. The task scheduling information received from the task scheduler 164 by the stashing hardware 162 enables it to determine which of the data caches 158 or 160 is the appropriate recipient for this cache stashing operation, such that the software task 170 can make access to the relevant data.

Figure 6B:
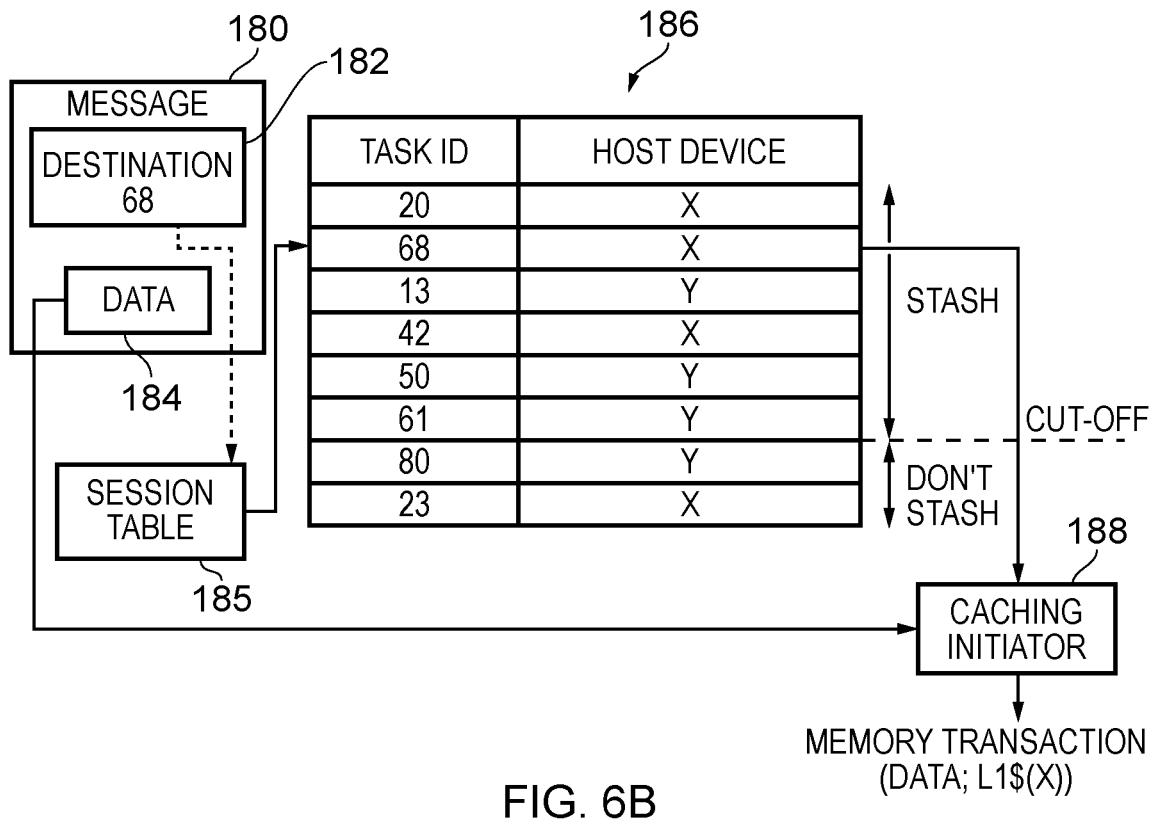

FIG. 6B schematically illustrates in more detail the manner in which the stashing hardware may make use of task scheduling information in this manner. On the left of FIG. 6B a message 180 is schematically illustrated to comprise an indication of the destination of the message 182 and an indication of data for processing 184. It should be appreciated that this data 184 may only be a reference to the data such as an address or a pointer rather than the data itself. The figure also shows a scheduling table 186 showing a set of task IDs and the destination host devices on which the task scheduler has scheduled those processes to be executed. The tasks are executed in sequence in the table for each host device and accordingly the task ID 20 is currently executing on host device X whilst task ID 13 is currently executing on host device Y. Accordingly, the stashing hardware can use content of message 180 indicating that its destination (i.e. the recipient task) is the data processing agent with the task ID 68 to refer to the scheduling information 186 which indicates that this task is scheduled to execute on host device X (once task ID 20 has completed). The dashed line indicates that this is not essential though and the stashing hardware can alternatively make use of the link used to convey the message 180 and reference to the session table 180 to determine that its destination is the data processing agent with the task ID 68. The stashing hardware can therefore make use of a caching initiator mechanism 188 to cause the data 184 as indicated in the message to be stashed into the data cache associated with the host device X. This may for example take place by the caching initiator 188 issuing a memory transaction which specifies the data 184 and the relevant specific cache. Also indicated in the illustration of FIG. 6B is a stashing cut-off, whereby the stashing manager can determine that when a task is not currently executing and is not expected to execute within a relatively short period of time that stashing is not worthwhile and in the example of the FIG. 6B therefore if the message had been received specifying a destination task ID 80 or 23 the stashing management device would not have initiated a cache stashing for the associated data.

Figure 7:
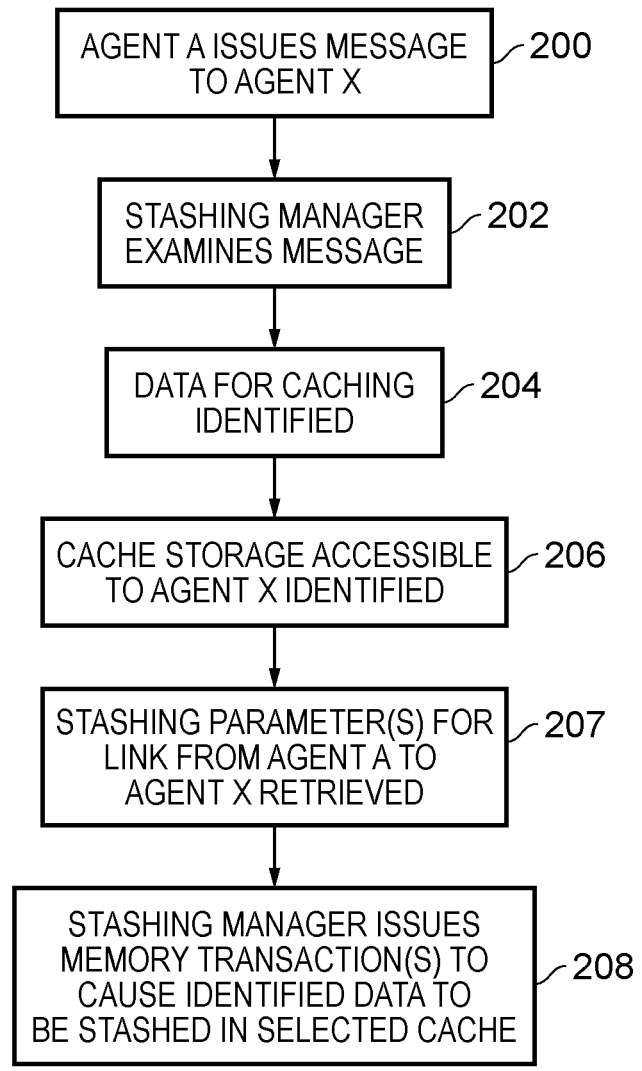
FIG. 7 shows a sequence of steps which are taken in one embodiment.

FIG. 7 shows a sequence of steps which are taken in the method of one embodiment. The steps begin at 200 where Agent A issues a message to Agent X. Then at step 202 the stashing manager examines the message. At step 204 the data which should be cached is identified and at step 206 cache storage accessible to Agent X is identified. At step 207 the stashing manager retrieves one or more stashing control parameters from a stored definition of the link from Agent A to Agent X. At the final step 208 the stashing manager issues one or memory transactions to cause the identified data to be stashed in the selected cache.

Figure 8:
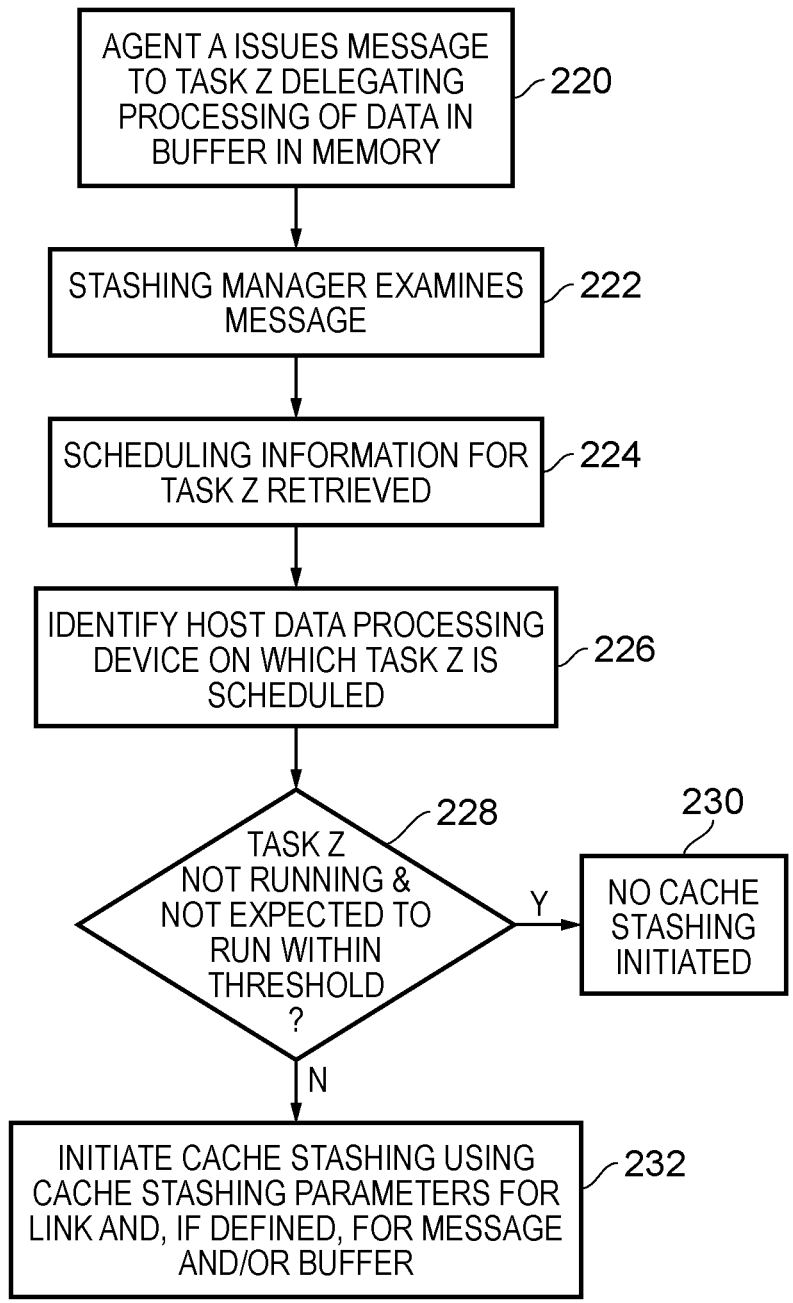
FIG. 8 shows a sequence of steps which are taken in one embodiment.

FIG. 8 shows a sequence of steps which are taken in the method of one embodiment. The step begins at step 220, where Agent A issues a message to task Z delegating some processing of some specified data in a buffer in memory. At step 222 a stashing manager examines the message and at step 224 scheduling information for task Z is retrieved (for example from a task scheduler within the system). At step 226 a host data processing device on which task Z is scheduled is then identified. At step 228 it is determined if task Z is currently not executing and is not expected to be executed within a threshold period and if this is the case the flow proceeds to step 230 and no cache stashing is initiated. However, if the condition at step 228 is not true then the flow proceeds to step 232 where the stashing manager initiates the cache stashing using the defined cache stashing parameters for the defined link from Agent A to Agent X, and (if also defined) for the message and/or the data buffer, to cause at least a proportion of the data specified in the message to be stashed in a cache associated with the host data processing device upon which task Z is scheduled.

In brief overall summary a data processing system and a method of data processing are provided. The system comprises a first data processing agent, a second data processing agent, and a third data processing agent. Each of the second and third data processing agents have access to one or more caches. A messaging mechanism conveys a message from the first data processing agent to one of the second and third data processing agents specified as a message destination agent in the message. A stashing manager monitors the messaging mechanism and selectively causes data associated with the message to be cached for access by the message destination agent in a cache of the one or more caches in dependence on at least one parameter associated with the message and at least one stashing control parameter defined for a link from the first data processing agent to the message destination agent.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing system comprising:
   a first data processing agent, a second data processing agent, and a third data processing agent, wherein each of the second data processing agent and the third data processing agent have access to one or more caches;
   a messaging mechanism to convey a message from the first data processing agent to one of the second data processing agent and the third data processing agent specified as a message destination agent in the message;
   stashing management circuitry, shared between the first data processing agent, the second data processing agent and the third data processing agent, to monitor the messaging mechanism and selectively to cause data associated with the message to be cached for access by the message destination agent in a cache of the one or more caches in dependence on at least one parameter associated with the message and at least one stashing control parameter defined for any message transmitted via a link from the first data processing agent to the message destination agent.

2. The data processing system of claim 1, further comprising:
   a plurality of data processing devices to host the first data processing agent, the second data processing agent, and the third data processing agent,
   wherein the stashing management circuitry is responsive to host information indicative of a host data processing device for the message destination agent of the plurality of data processing devices to cause the data associated with the message to be cached in a selected cache of the one or more caches accessible to the host data processing device.

3. The data processing system of claim 2, further comprising:
   a task scheduler to schedule software tasks for execution on the plurality of data processing devices,
   wherein the host information is provided by the task scheduler as a scheduled allocation to the host data processing device of a software task corresponding to the message destination agent.

4. The data processing system of claim 3, wherein the stashing management circuitry is responsive to the scheduled allocation indicating that the software task corresponding to the message destination agent is not expected to begin execution within a predetermined time period to select not to cause the data associated with the message to be cached in the cache of the one or more caches.

5. The data processing system of claim 1, wherein the stashing management circuitry is responsive to at least one further stashing control parameter to configure at least one aspect of caching of the data associated with the message in the cache of the one or more caches.

6. The data processing system of claim 1, wherein the at least one stashing control parameter specifies a cache level at which the data associated with the message is to be cached.

7. The data processing system of claim 1, wherein the at least one stashing control parameter specifies a state type with which the data associated with the message is to be cached.

8. The data processing system of claim 7, wherein the state type specifies a cache coherency protocol state with which the data associated with the message is to be cached.

9. The data processing system of claim 1, wherein the at least one stashing control parameter specifies a size of the data associated with the message which is to be cached.

10. The data processing system of claim 1, wherein the at least one stashing control parameter specifies a subset of a greater set of data associated with the message as the data associated with the message which is to be cached.

11. The data processing system of claim 10, wherein the subset is specified as at least one offset and data length within the greater set of data associated with the message.

12. The data processing system of claim 5, wherein the at least one further stashing control parameter forms part of the message.

13. The data processing system of claim 5, wherein the at least one stashing control parameter is predefined for a buffer holding the data associated with the message to which a pointer in the message points.

14. The data processing system of claim 1, wherein the data associated with the message is comprised within the message.

15. The data processing system of claim 1, wherein the data associated with the message is indicated by an address comprised within the message.

16. The data processing system of claim 1, wherein the data associated with the message is referenced by a pointer comprised within the message.

17. A method of data processing comprising:
   operating a first data processing agent, a second data processing agent, and a third data processing agent in a data processing system, wherein each of the second data processing agent and the third data processing agent have access to one or more caches;

conveying via a messaging mechanism a message from the first data processing agent to one of the second data processing agent and the third data processing agent specified as a message destination agent in the message;

monitoring, with circuitry shared between the first data processing agent, the second data processing agent and the third data processing agent, the messaging mechanism and selectively causing data associated with the message to be cached for access by the message destination agent in a cache of the one or more caches in dependence on at least one parameter associated with the message and at least one stashing control parameter defined for any message transmitted via a link from the first data processing agent to the message destination agent.

18. A data processing system comprising:

means for operating a first data processing agent;

means for operating a second data processing agent;

means for operating a third data processing agent, wherein each of the means for operating a second data processing agent and the means for operating a third data processing agent have access to one or more means for caching;

means for conveying via a messaging mechanism a message from the means for operating a first data processing agent to one of the means for operating a second data processing agent and the means for operating a third data processing agent specified as a message destination agent in the message; and means for monitoring the messaging mechanism and selectively causing data associated with the message to be cached for access by the message destination agent in a means for caching of the one or more means for caching in dependence on at least one parameter associated with the message and at least one stashing control parameter defined for any message transmitted via a link from the first data processing agent to the message destination agent, the means for monitoring the messaging mechanism being shared between the first data processing agent, the second data processing agent and the third data processing agent.

* * * * *